United States Patent [19]

Kobayashi et al.

[11] Patent Number: 5,061,537
[45] Date of Patent: Oct. 29, 1991

[54] MAGNETIC DISK COMPRISING A FLEXIBLE SUBSTRATE AND A PLASTIC FILM EACH HAVING A SPECIFIED YOUNG'S MODULUS AND WHICH MEET SPECIFIED THICKNESS RELATIONSHIPS

[75] Inventors: Yukari Kobayashi; Kiyosumi Kanazawa, both of Nagano, Japan

[73] Assignee: TDK Corporation, Tokyo, Japan

[21] Appl. No.: 359,321

[22] Filed: May 31, 1989

[30] Foreign Application Priority Data

May 2, 1989 [JP] Japan .................................. 1-113134

[51] Int. Cl.$^5$ .............................................. G11B 5/82
[52] U.S. Cl. ...................................... 428/66; 428/694; 428/900; 360/97.04; 360/135
[58] Field of Search ................... 428/64, 66, 694, 900; 360/97.04, 135

[56] References Cited

U.S. PATENT DOCUMENTS

| | | | |
|---|---|---|---|
| 3,373,413 | 3/1968 | Treseder | 340/174.1 |
| 4,897,134 | 1/1990 | Doering | 156/73.1 |
| 4,943,611 | 7/1990 | Todo et al. | 524/493 |

FOREIGN PATENT DOCUMENTS

| | | |
|---|---|---|
| 57-078634 | 5/1982 | Japan . |
| 60-191431 | 9/1985 | Japan . |
| 61-240490 | 10/1986 | Japan . |

*Primary Examiner*—Merrell C. Cashion, Jr.
*Assistant Examiner*—Stevan A. Resan
*Attorney, Agent, or Firm*—Oblon, Spivak, McClelland, Maier & Neustadt

[57] ABSTRACT

A magnetic disk comprising an annular flexible substrate and a magnetic layer on at least one substrate major surface is provided with a plastic film ring or a pair of plastic film rings along the outer periphery of the disk. The ring is adhesively secured to the disk on the substrate major surface. The ring thickness is controlled to a specific range relative to the substrate thickness, presenting a magnetic disk featuring stable operation and a minimized output variation.

10 Claims, 5 Drawing Sheets

F I G. 1
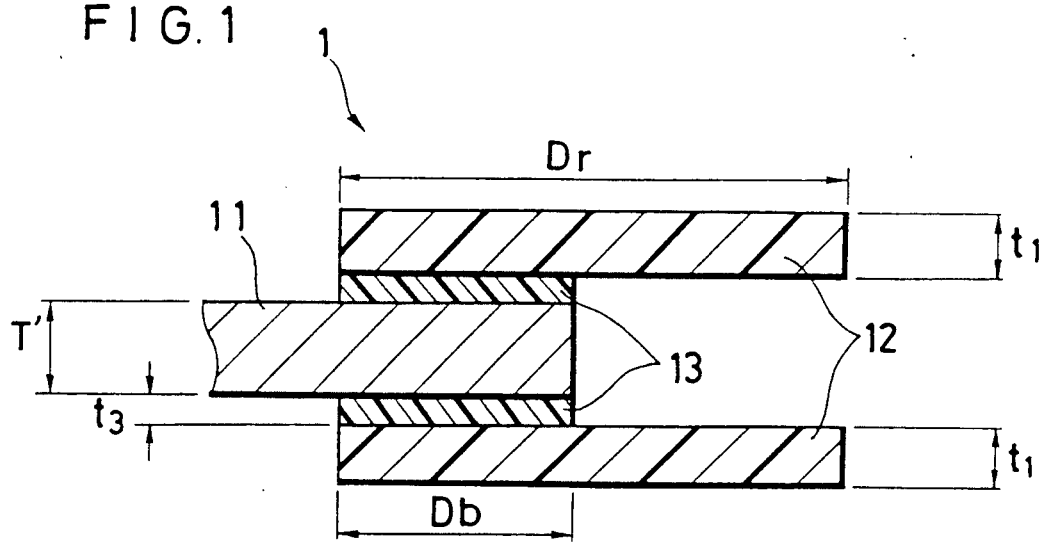
F I G. 2
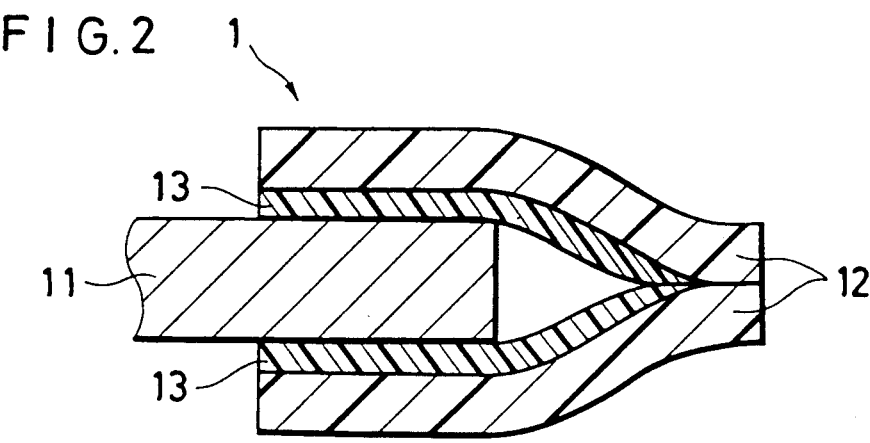
F I G. 3
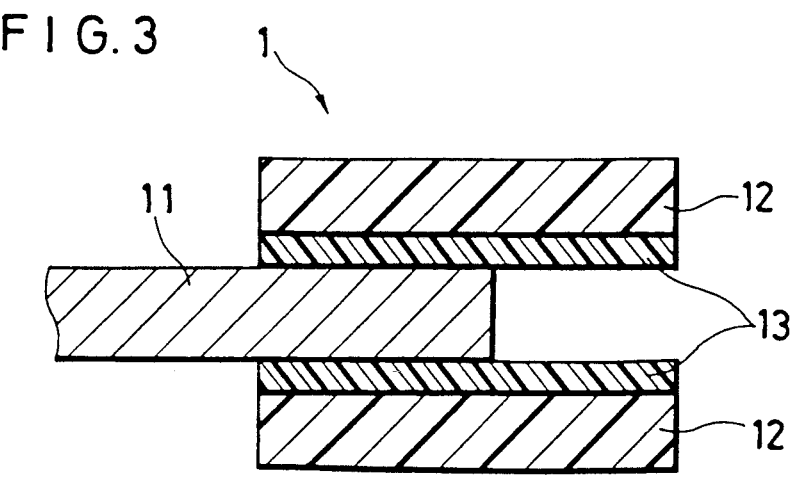

FIG. 8  SAMPLE NO. 1 : CONTROL
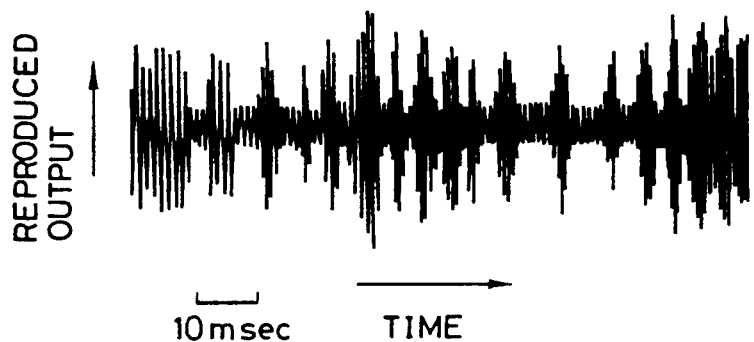
10 msec    TIME
FIG. 9  SAMPLE NO. 3 : INVENTION
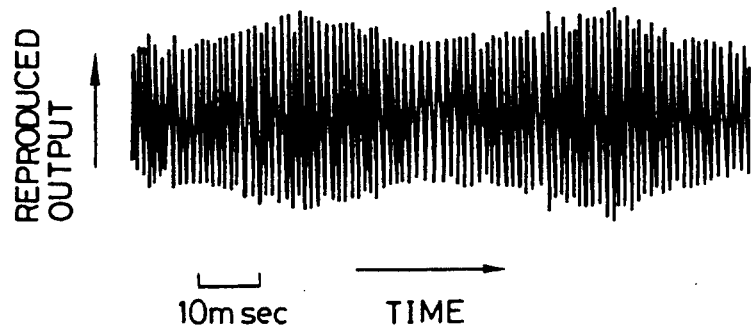
10 msec    TIME
FIG. 10  SAMPLE NO. 5 : COMPARISON
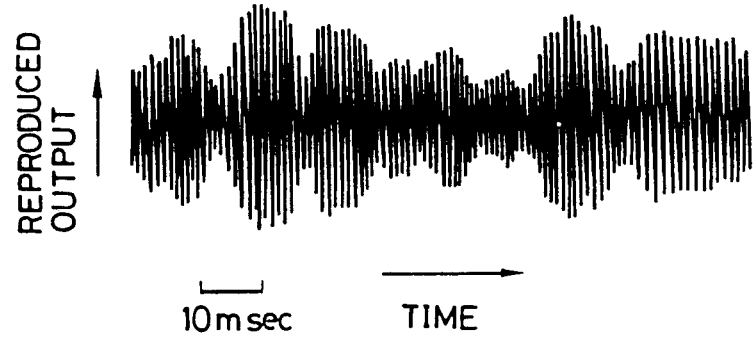
10 msec    TIME

MAGNETIC DISK COMPRISING A FLEXIBLE SUBSTRATE AND A PLASTIC FILM EACH HAVING A SPECIFIED YOUNG'S MODULUS AND WHICH MEET SPECIFIED THICKNESS RELATIONSHIPS

This invention relates to a magnetic disk having a flexible substrate.

BACKGROUND OF THE INVENTION

Magnetic disks having a flexible substrate generally known as floppy disks are widely used in computers, word processors and the like. Floppy disks are usually fabricated by coating a magnetic layer on at least one surface of a length or section of nonmagnetic substrate film. The coated sheeting is dried, cured, and calendered before a disk is punched out of the sheeting. The disk is finally received in a jacket or cartridge having a cleaning liner mounted inside.

In addition to magnetic layers of the coating type, magnetic layers of the thin film type are also known which are generally formed from metals or alloys, typically Co-Cr alloy by sputtering or other various thin film forming techniques.

Since the manufacture of floppy disks involves punching as described above, burrs and cracks occur on the disks, which would disturb stable disk rotation.

When the magnetic layer is formed by vapor phase deposition, the substrate is inevitably heated during the deposition process. Such heating would induce stresses or some deformation like deflection in the disk, also causing unstable disk rotation.

Japanese Patent Application Kokai No. 240490/1986 proposes to cover the peripheral edge of a magnetic disk with a plastic film. The configuration of the magnetic disk proposed therein is illustrated in FIGS. 11 and 12. A magnetic recording medium in the form of a disk 100 includes an annular polymer film 102 and a magnetic layer in the form of a metal thin film 103 on each surface thereof. A pair of plastic film rings 104 and 105 enclose the periphery of the disk on both sides. These plastic film rings covering the disk edge prevent the disk edge, which is otherwise sharp, from scratching the liner of the jacket.

Disk substrates are required to exhibit greater flatness as the recording density of the associated magnetic disk increases. If the substrate is less flat, the disk will produce more output variations. For example, magnetic disks of the perpendicular recording type having a magnetic layer in the form of a sputtered Co-Cr alloy film should provide a high degree of flatness in order to allow for high density recording. Nevertheless, these disks tend to deform because not only the magnetic layer, but additional layers such as a soft magnetic film between the magnetic layer and the substrate and a solid protective film on the magnetic layer are also formed by vapor phase deposition.

The use of plastic film rings as proposed in the above-cited Japanese Patent Application Kokai is effective in preventing deformation of disks and hence variation of reproduced output. If the plastic film rings used are thicker than necessary, the disk as a whole becomes too stiff to achieve smooth contact with the magnetic head. As a result, variations occur in the reproduced output.

SUMMARY OF THE INVENTION

An object of the present invention is to provide an improved magnetic disk which can mechanically operate in a stable manner and electromagnetically produce outputs with a minimized variation.

The present invention provides a magnetic disk comprising an annular flexible substrate having a pair of opposed major surfaces, a magnetic layer on at least one substrate major surface, and a plastic ring secured to the outer peripheral edge of the disk.

In one form, a pair of plastic film rings are secured to the outer periphery of the disk on opposite major surfaces of the substrate so as to meet the following relationships:

$$T-20 \leq t1 \leq T+40$$

and $$t1 \geq 10$$

wherein $t1$ is the thickness in $\mu m$ of each ring and $T$ is the thickness in $\mu m$ of the substrate.

In another form, a plastic film ring is secured to the outer periphery of the disk on one major surface of the substrate so as to meet the following relationships:

$$2T-40 \leq t2 \leq 2T+80$$

and $$t2 \geq 20$$

wherein $t2$ is the thickness in $\mu m$ of the ring and $T$ is the thickness in $\mu m$ of the substrate.

In preferred forms, the thickness (T) of the substrate is in the range of 15 to 110 $\mu m$.

The plastic film ring is attached to the outer periphery of the disk through an adhesive layer of 10 to 75 $\mu m$ thick. The adhesive is of a composition containing a base resin and a powder inorganic filler.

The magnetic layer is a perpendicular magnetizable film formed by vapor phase deposition.

Preferably, a soft magnetic layer is formed between the substrate and the magnetic layer by vapor phase deposition.

Preferably, a solid protective film containing a metal and/or a metalloid and oxygen is formed on the magnetic layer by vapor phase deposition.

Preferably, a lubricating film containing an organic compound is on the solid protective film.

Broadly stated, the magnetic disk of the present invention is encircled and bound on at least one of major surfaces along the perimeter thereof with a plastic film ring of a specific thickness. The binding ring provides the disk with improved flatness by compensating for any deformations of the disk including strains and deflection induced during formation of the magnetic layer and other layers. The ring imparts adequate stiffness to the disk to allow the disk to properly flex upon sliding contact with the magnetic head for achieving close contact with the head. The magnetic disk also has benefits of a minimized variation in reproduced output over its entire tracks and minimized error occurrence.

BRIEF DESCRIPTION OF THE DRAWINGS

The above and other objects, features, an advantages of the present invention will be better understood from the following description taken in conjunction with the accompanying drawings, in which:

FIGS. 1, 2, and 3 are cross sections of peripheral portions of magnetic disks according to preferred embodiments of the present invention, showing the attachment of plastic film rings to the peripheral edge of the disk;

FIGS. 8, 9 and 10 are oscilloscopic diagrams showing reproduced outputs of magnetic disk sample Nos. 1, 3, and 5 in Example 1;

DESCRIPTION OF THE PREFERRED EMBODIMENTS

Figure 11:
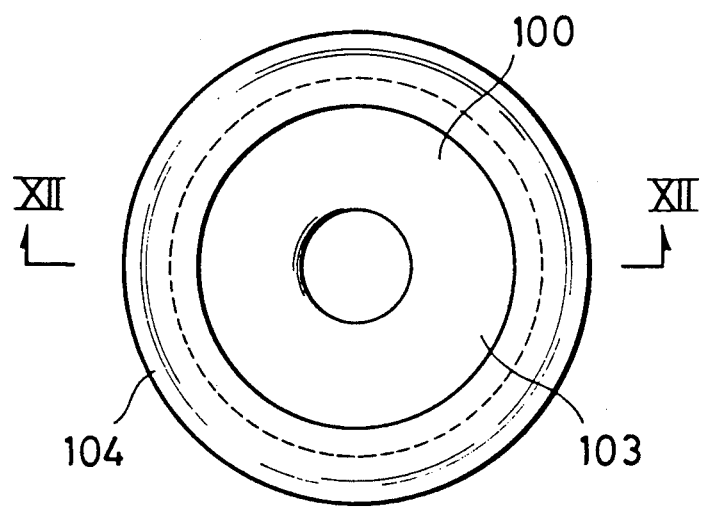
FIG. 11 is a plan view of a prior art magnetic disk having a peripheral ring.
Figure 12:
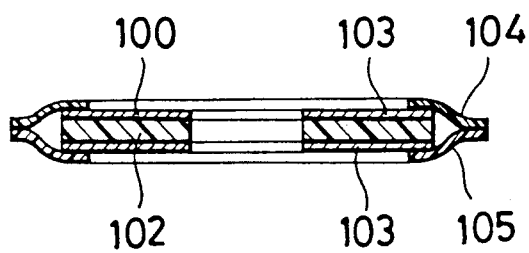
FIG. 12 is a cross section taken along lines XII-XII in FIG. 11.

FIGS. 1, 2, and 3 are cross sections of magnetic disks according to preferred embodiments of the present invention. Only a peripheral portion of the disk is shown to illustrate the attachment of plastic film rings to the outer periphery of the disk. An overall view of a disk encircled with a ring is substantially the same as FIGS. 11 and 12.

The magnetic disk generally designated at 1 is illustrated in FIGS. 1, 2, and 3 as comprising a disk body 11 and a pair of plastic film rings 12 bonded to the opposed major surfaces of the disk body along its periphery through adhesive layers 13. The disk body 11 used herein is a flexible substrate having a magnetic layer on at least one of its major surfaces as will be later described in FIG. 4.

In the embodiments of FIGS. 1 and 3, the rings 12 radially extend beyond the outer periphery of the disk body 11. The rings 12 are cantilevered in the sense that the extensions are not bonded together.

In the embodiment of FIG. 2, the rings 12 radially extend beyond the outer periphery of the disk body 11 and bonded together at their outer peripheral edges through adhesive layers 13.

Although the rings are of a rectangular cross section in the illustrated embodiments, it is also contemplated to use a plastic film ring of L-shaped cross section (not shown). An L-shaped ring on its perpendicular inner walls is bonded to a major surface peripheral portion and the circumferential edge of a disk body. The outer corner of the rings may be rounded if desired.

The objects are achieved by any of the illustrated embodiments in which a pair of rings are attached to the disk body along the outer periphery. However, it suffices for the present invention that a plastic film ring 12 is attached to only one major surface of the disk body 11. Attachment of a single plastic ring can achieve the objects insofar as the single ring has a specific thickness as defined herein. In this embodiment, it is preferred to attach a plastic film ring to the one major surface of the disk body on which burrs and cracks are likely to occur upon blanking of a disk substrate.

Figure 4:
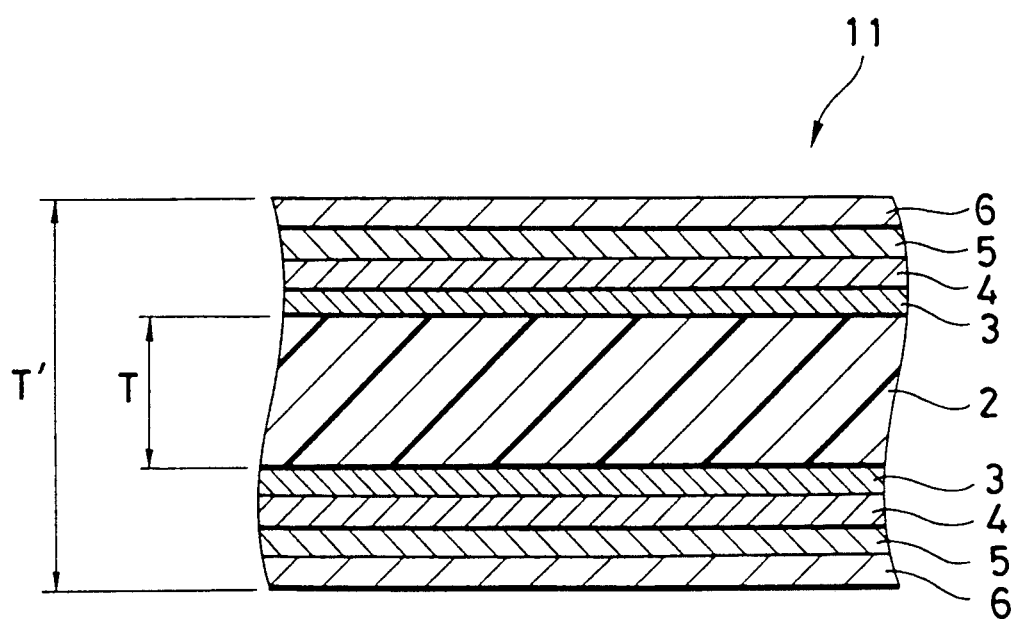
FIG. 4 is a partial cross section of a magnetic disk in preferred form.

In the embodiments of FIGS. 1, 2, and 3 wherein a pair of rings are attached to the opposed major surfaces of the disk body along the outer periphery, the rings should meet the following relationships:

$$T - 20 \leq t1 \leq T + 40$$

and $$t1 \geq 10$$

wherein t1 is the thickness in $\mu$m of each ring and T is the thickness in $\mu$m of the substrate (see FIGS. 1 and 4). Each of the two plastic film rings attached to the opposed major surfaces must meet the above-defined thickness requirements. It is preferred that the two rings have substantially the same thickness. It is to be noted that the thickness T of the substrate is shown in FIG. 4. The disk body 11 shown in FIG. 1 has a thickness T′ because it includes a magnetic layer and any other layers in addition to the substrate. The substrate generally has a thickness T of about 7 to about 110 $\mu$m as will be later described in detail.

In the other embodiment wherein a single plastic film ring is attached to only one major surface of the disk body along the outer periphery, the rings should meet the following relationships:

$$2T - 40 \leq t2 \leq 2T + 80$$

and $$t2 \geq 20$$

wherein t2 is the thickness in $\mu$m of the ring and T is the thickness in $\mu$m of the substrate.

The rings afford less disk shape correcting effect if t1 or t2 are below the above-defined range. If t1 or t2 exceeds the above-defined range, the disk as a whole becomes too stiff to achieve optimum head contact, causing variations in reproduced output.

The rings 12 preferably have a radial distance Dr of about 0.5 to about 4 mm. A narrower ring having a radial distance below this range would be less effective in correcting the disk shape, rather difficult to handle, and short of bond strength to the disk body. A wider ring having a radial distance beyond the range would on the inside, reduce the effective recording area on the disk body to reduce the number of available tracks and on the outside, prevent accommodation of the disk in a jacket.

Figure 7:
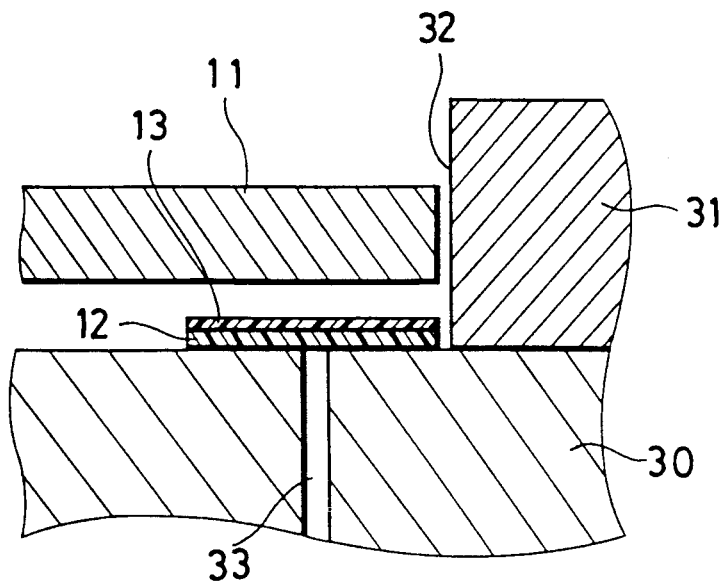
FIG. 7 is a partial enlarged view similar to FIG. 6, showing a different arrangement of a ring and a disk.

The plastic film rings 12 have an outer diameter such that the rings extend beyond the outer diameter of the disk body 11 in the illustrated embodiments of FIGS. 1, 2, and 3. The outer diameter of the rings 12 may be equal to or smaller than the outer diameter of the disk body 11. A ring having an equal outer diameter to the disk body is shown in FIG. 7. Preferably, the ring 12 is bonded to the disk body 11 over a radial distance Db of at least 0.8 mm. A ring would afford less desirable disk shape correcting effect and be rather short of bond strength to the disk body if the bonding distance Db is less than 0.8 mm.

The material of which the plastic film rings are made is not particularly limited, but may preferably be selected from polyethylene, polyimide, polyethylene terephthalate (PET), and polyvinyl chloride, with the PET being most preferred because of economy. Polyimide resins are also advantageous because they have a sufficient Young's modulus to achieve shape correction. It is to be noted that the rings preferably have a Young's modulus of at least 300 kgf/mm$^2$, especially about 350 to 950 kgf/mm$^2$.

The resin materials from which the rings are made may contain powder inorganic fillers. Preferred examples of the inorganic filler used herein include carbon, graphite, and titanium oxide. The powder inorganic filler is used for lubrication, anti-static, stiffening and coloring purposes. In this respect, better results are obtained when the rings are formed from a resin composition containing about 5 to 30% by weight of a powder inorganic filler.

The adhesive (13) for bonding the rings 12 to the disk body 11 is not particularly limited, but may preferably be selected from tacky adhesives such as acrylate ester adhesives and radiation-curable adhesives such as acrylic resin and unsaturated polyester base adhesives.

The adhesive layers 13 preferably has a thickness t3 of about 10 to 75 μm, more preferably from about 20 to about 60 μm although the exact thickness depends on the identity of adhesive. An adhesive layer below the range would be too thin to bond the ring to the disk body. An adhesive layer beyond the range would be too thick and not recommendable for smooth rotation of the disk within the jacket or cartridge.

Preferably, the sum of thicknesses of the ring and the adhesive layer (t1+t3) does not exceed 150 μm. Also preferably, the overall thickness of the ring plus disk body, (t1+t3+T'+t3+t1) for the double ring arrangement or (t2+t3+T') for the single ring arrangement, does not exceed 350 μm.

The adhesive layers 13 are preferably present at the entire interfaces between the rings 12 and the disk body 11 as shown in FIGS. 1 to 3 for firmly bonding the rings to the disk body. It is also preferred for the adhesive layers 13 not to extend beyond the outer and inner edges of the rings 12 in the assembled state as shown in FIGS. 1 to 3 for preventing undesired deposition of dust and debris.

The adhesive layers 13 are present only at the entire interfaces between the rings 12 and the disk body 11 in the embodiment shown in FIG. 1. Such local application of adhesive may be done by a screen printing technique. The embodiments of FIGS. 2 and 3 wherein the adhesive layers 13 are coextensive with the rings 12 require no special technique for adhesive application and are thus less expensive.

In general, the rings 12 each are attached to the uppermost layer of the disk body 11, which will be described later in conjunction with FIG. 4.

The plastic film rings 12 may be prepared by any desired methods. Typically, the rings can be prepared by applying adhesive to a plastic sheet and die cutting the sheet into a ring shape.

Figure 5:
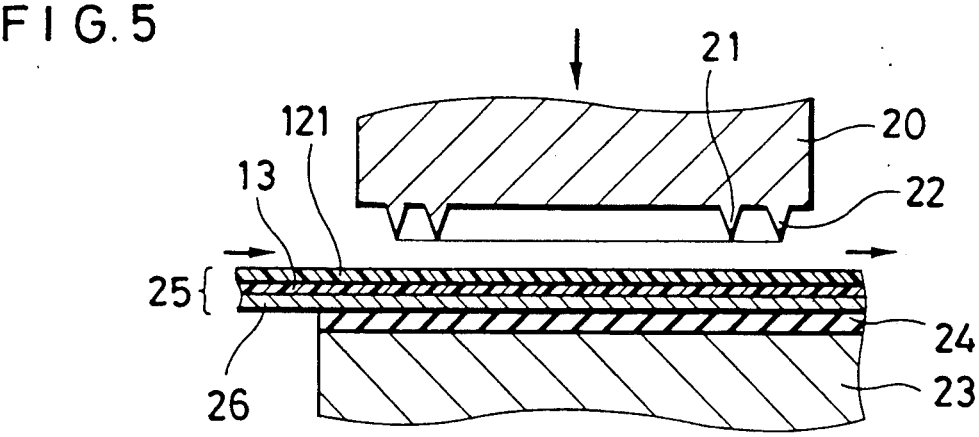
FIG. 5 is a schematic cross sectional view showing an apparatus for die cutting a ring out of a plastic film.

Such a typical method for preparing the rings is described by referring to FIG. 5. The blanking apparatus shown in FIG. 5 includes an upper die 20 having concentric cutting edges 21 and 22 at the bottom and a lower base 23 on which a cushion sheet 24 rests. A length of laminate 25 is fed between the upper die 20 and the base 23 as shown by arrows. The laminate 25 is a plastic film 121 coated on the back surface with an adhesive layer 13 which is lined with a release paper 26. With the laminate 25 positioned in place, the upper die 20 is moved down toward the base 23 as shown by an arrow, die cutting a ring out of the laminate 25.

The laminate ring thus obtained is then attached to the disk body.

Figure 6:
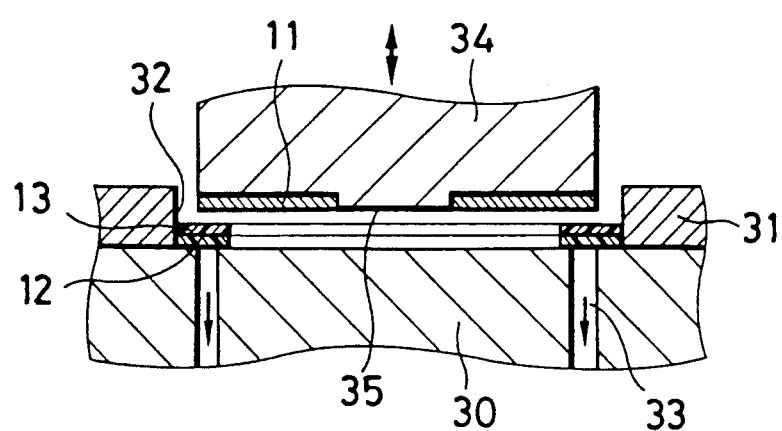
FIG. 6 is a schematic cross sectional view showing an apparatus for bonding a plastic film ring to a disk.

One typical method for bonding the plastic ring 12 to the disk body 11 is described by referring to FIG. 6. The joining apparatus shown in FIG. 6 includes a platen 30 having a flat upper surface. A guide member 31 defining a circular cavity 32 rests on the platen. Since the circular cavity 32 serves to position the ring 12, it has a diameter slightly larger than the outer diameter of the ring 12. The platen 30 and the guide member 31 may be either integral or separable as shown in the figure.

A plurality of regularly spaced ports 33 are perforated in the upper surface of the platen 30 where the ring is to be placed. These ports 33 are connected to a vacuum pump (not shown).

The apparatus further includes a vertically movable upper die 34 having a circular boss 35 at the bottom on which a disk body 11 is snugly fitted. The die 34 is located relative to the platen 30 such that the boss 33 or the disk body is aligned with the circular cavity 32 in the guide member 31 or the ring.

With this apparatus, the ring is attached to the disk body by first fitting the disk body 11 on the boss 35 of the upper die 34. The laminate ring which is prepared as described in connection with FIG. 5 is placed in the circular cavity 32 such that the release paper 26 is at the top.

The vacuum pump is then actuated to suck in air through the ports 33 to hold the laminate ring on the platen 30. The release paper 26 is then removed without causing wrinkles or creases to the ring 12. FIG. 6 shows the arrangement at this point.

The upper die 34 is then moved down toward the platen 30 until the disk body 11 thereon contacts the ring 12. The ring 12 is bonded to the disk body 11 in registry.

When it is desired to attach a pair of rings to opposite surfaces of the disk, the above-described procedure is repeated. The disk body is reversed with respect to the upper die 34 at the end of the above-described procedure and another laminate ring is placed on the platen followed by a similar procedure.

FIG. 7 is an enlarged view of a portion of the joining apparatus of FIG. 6 showing the procedure of attaching a ring to a disk body. The only difference from FIG. 6 is that the ring 12 has approximately the same diameter as the disk body 11. The circular cavity 32 in the guide member 31 has a slightly larger diameter than the disk body 11 and the ring 12. The joining procedure is the same as described for FIG. 6.

In the case of single ring attachment, the ring is bonded to the major surface of the disk body on which burrs and cracks have been formed on the substrate during its preparation as described above.

The disk body 11 to which the plastic film ring or rings 12 are attached has a magnetic layer on at least one major surface of a substrate.

One typical example of the magnetic layer is a perpendicular magnetizable thin film of Co-Cr base alloy formed by vapor phase deposition. The perpendicular magnetizable layer is often referred to in the following description although the invention is not limited thereto.

FIG. 4 is a cross section of the disk body 11 in one preferred form. This disk body 11 is of the double side recording type and illustrated in the figure as comprising a substrate 2 having a pair of opposed major surfaces and a pair of soft magnetic films 3, magnetic layers 4, solid protective layers 5, and lubricating layers 6 disposed on the substrate major surfaces in this order.

In the magnetic disk of the double side recording type as shown in the figure, deflections in opposite directions of the substrate 2 induced during formation of soft magnetic films 3, magnetic layers 4, solid protective layers 5 and the like are offset as a whole. In the magnetic disk of the single side recording type wherein the layers are only on one major surface of the substrate, a backcoat layer is formed on the other major surface for preventing any warpage of the substrate. The backcoat layer may preferably be a sputtered film of a metal such as Al and Ti, an inorganic oxide or nitride such as $SiO_2$, $Si^3N_4$, $Al_2O_3$, and the oxide or nitride such as $SiO_2$, $Si_3N_4$, $Al_2O_3$, and the materials later described for the solid protective layer, or a mixture thereof. The backcoat layer may also be of the coating type well known in the art.

The substrate 2 may be formed of any desired materials. A choice may be made of polymers including polyimide, polyethylene terephthalate (PET), polyphenylene sulfide (PPS), polyamide, polyethylene naphthalate (PEN), and polyether ether ketone (PEEK). Since the perpendicular magnetizable layer of Co-Cr alloy is formed by vapor phase deposition, the substrate is required to have heat resistance, dimensional stability and a limited surface roughness. Polyimide resins are preferred in this respect.

Since the magnetic layer of Co-Cr alloy is often heat treated for improving magnetic properties, a proper choice may be made of a substrate material which can withstand heating at a temperature of at least 150° C., especially 200° to 300° C. for about 10 seconds to about 10 minutes. Most often, such heating is by radiation from the sputtering target during deposition of the magnetic layer itself and the underlying layer or soft magnetic layer.

The substrate preferably has a coefficient of linear expansion well coincident with those of metals of the soft magnetic layer and the magnetic layer to be formed on the substrate. For example, the substrate preferably has a coefficient of linear expansion of $5 \times 10^-$ to $15 \times 10^{-6}$/deg. in the temperature range of 20° to 60° C.

The substrate preferably has a Young's modulus of about 300 to about 1,000 $kgf/mm^2$ because further improvements in durability and head contact are expectable. With a lower Young's modulus below the range, the durability might be lowered while the head contact remains good. With a higher Young's modulus beyond the range, the head contact might become unsatisfactory while the durability remains high.

The substrate preferably has a maximum surface roughness (Rmax) of up to 0.02 $\mu$m, Rmax being defined by JIS B-0601. This range of surface roughness is effective in reducing the spacing loss between the head and the disk, thus increasing the recording density. It becomes rather difficult to achieve a high recording density if Rmax is above 0.02 $\mu$m.

Such surface roughness is preferably accomplished on both the surfaces of the substrate. The desired effect is available when such surface roughness is accomplished at least on the surface of the substrate where the magnetic layer is to be formed.

If desired, a filler may be included in the substrate material for a reduced coefficient of friction.

The diameter of the substrate may be suitably selected depending on a particular application of the disk. The diameter is generally in the range of from about 50 to about 130 mm. The thickness T of substrate generally ranges from about 7 to 110 $\mu$m, more preferably about 7 to about 80 $\mu$m, most preferably about 20 to about 50 $\mu$m.

The soft magnetic film 3 is disposed on the substrate 2 for the purpose of improving reproduced output.

The soft magnetic film 3 is preferably formed of Fe-Ni base alloys including Fe-Ni alloy (Permalloy), Fe-Ni-Mo alloy, Fe-Ni-Cr alloy, Fe-Ni-Nb alloy, Fe-Ni-Mn-Cu alloy, Fe-Ni-Mo-Nb alloy, Fe-Ni-Mo-Cu alloy, and Fe-Ni-Si-Al alloy. Besides the Fe-Ni alloys, Fe-Co-V alloys are also useful. These alloys may contain Ti, Al, Si, Mn, Cu, Ta, C, O, N, Ar, Ca, Cr or the like if desired.

The soft magnetic film 3 preferably has a coercive force of about 6 to about 20 Oe in the plane of its surface. A soft magnetic film with such a coercive force assists the disk in reproducing a high output while reducing the modulation to 20% or less. A soft magnetic film with a coercive force below the range would increase the reproduced output at the sacrifice of modulation. A soft magnetic film with a coercive force beyond the range would further reduce the modulation at the sacrifice of reproduced output.

The soft magnetic film 3 is preferably about 0.3 to about 0.5 $\mu$m thick. Thinner films would little contribute to the reproduced output increase despite increased productivity whereas thicker films take a long time to form and thus reduce the productivity although the reproduced output is increased.

The soft magnetic film 3 is preferably formed by sputtering.

The magnetic layer 4 is disposed on the soft magnetic film 3. It is preferably a perpendicular magnetizable layer formed by vapor phase deposition. Most preferably it is a vapor phase grown Co-Cr alloy. Examples of the Co-Cr base alloy used herein include Co-Cr alloy, Co-Cr-B alloy, Co-Cr-Mn alloy, Co-Cr-Mn-B alloy, Co-Cr-Ta alloy, and Co-Cr-Si-Al alloy. These Co-Cr base alloys preferably contain about 16 to about 23 atom% of Cr. Also useful are Co-V base alloys. These alloys may contain O, N, Si, Al, Mn, Ar or the like if desired.

The magnetic layer 4 preferably has a coercive force of at least 400 Oe in a perpendicular direction. A magnetic layer with with a lower perpendicular coercive force would reproduce an insufficient output. No particular upper limit is imposed on the coercive force. Usually, magnetic layers can be readily formed up to a coercive force of about 1,500 Oe.

The magnetic layer 4 is preferably from about 0.05 to about 0.2 $\mu$m thick. Below the thickness range, the reproduced output and S/N ratio would become low. Beyond the range, the recording density would be lowered as demonstrated by a recording density D50 of lower than 100 KFRPI.

The magnetic layer 4 is preferably formed by vapor phase deposition, especially sputtering.

The solid protective layer 5 is disposed on the magnetic layer 4. The solid protective layer 5 is formed of a material containing oxygen (O) and at least one element selected from metals and metalloids, most often in amorphous state. Also nitrogen is often contained.

Preferably, the solid protective layer 5 on the surface has a contact angle with water of up to 80°, more preferably up to 60°, most preferably up to 40°. A choice of the contact angle within the range allows the organic lubricating layer 6 to be formed uniformly thereon. This is particularly true when the organic lubricating layer 6 is constructed of a liquid organic compound or an organic compound having a polar group or a hydrophilic group or moiety. It is to be noted that the lower limit of contact angle with water of the solid protective layer 5 is usually 8°.

The contact angle with water may be determined, for example, by applying pure water dropwise to the surface of the solid protective layer 5 and measuring the contact angle after 30 seconds under conditions: 18°-23° C. and 40-60% RH.

Preferred examples of the metals and metalloids in the solid protective layer 5 include rare earth elements (including yttrium, lanthanides, and actinides, to be abbreviated as R, hereinafter), Si, Al, Ti, Zn and B. In the preferred solid protective layer, Si and R are essential or Si and Al are essential in addition to oxygen. In addition to these essential elements, an additional element may be included in an amount of up to 1 atom% of the entire composition, for example, Fe, Mg, Ca, Sr, Ba, Ar and Mn.

More particularly, the composition of the solid protective layer 5 is preferably selected from Compositions I and II shown below.

Composition I

Composition I contains Si and Al as essential metalloid and metal elements as well as O and N. Silicon and aluminum are generally present in the form of oxide and nitride. These compounds in the solid protective layer may have a compositional deviation from their stoichiometry. The copresence of Si, Al, O and N contributes to an improvement in corrosion resistance.

Composition I preferably contains the elements in the following proportion.

Si: 20-80 at%, especially 40-70 at%
Al: 1-30 at%, especially 2-10 at%
O: 2-30 at%, especially 2-20 at%
N: 5-45 at%, especially 15-35 at%

More preferably, Composition I further contains R in addition to the essential elements. Preferred R is Y and lanthanides. The content of R is preferably 1 to 10 at%, more preferably 2 to 8 at%, provided that the total of the metal or metalloid elements other than R plus O and N is 100 at%. With such R contents, further improvements are expectable in durability, weatherability, and corrosion resistance, particularly in durability.

Preferred examples of R in Composition I include Y, La, Ce, Pr, Nd, Sm and Eu and a mixture thereof. Essential use of Y is particularly preferred. The preferred proportion of Y in R elements is at least 50%. Further improvements are expectable in durability, weatherability, and corrosion resistance in these cases.

When the solid protective layer 5 is formed by sputtering, a target having these elements incorporated is used. Such a target is dense enough for efficient cooling, generating a reduced radiant heat during sputtering.

R may take either elemental form or compound form in the solid protective layer 5. When R is present in compound form, it is preferably an oxide.

Composition II

Composition II contains Si and R as essential metalloid and metal elements as well as 0 and N.

The R in Composition II is preferably at least one of La and Ce. La and Ce are generally present in the form of oxides. These oxides may have a compositional deviation from their stoichiometry: $La_2O_3$ and $CeO_2$. Either La or Ce or both La and Ce are present. In the latter case, La and Ce may present in any desired proportion.

In addition to La and/or Ce, any other rare earth elements including yttrium, for example, Y and Er may be contained. The proportion of La and/or Ce in all the R elements is preferably set at least 50%.

Composition II contains Si in addition of the oxide(s) of R element(s). Silicon is generally present in the form of oxide and nitride. These compounds may have a compositional deviation from their stoichiometry.

Composition II preferably contains the elements in the following proportion.

Si: 10-80 at%, especially 20-60 at%
O: 10-80 at%, especially 15-60 at%
N: 2-60 at%, especially 3-50 at%

The content of R is 1-10 at%, especially 2-8 at% provided that the atomic percent of R is calculated on the basis that the total of the metal or metalloid element(s) other than R plus O and N is 100 at%. With such R contents, improvements are expectable in durability, weatherability, and corrosion resistance, particularly in durability.

Besides Compositions I and II, the solid protective layer 5 may also be formed of $Al_2O_3$ or the like.

The contents of the respective elements in the solid protective layer 5 may be measured by Auger, ESCA and SIMS analysis.

The solid protective layer 5 of the above-mentioned composition is preferably formed by vapor phase deposition, especially sputtering. The sputtering may use a target in the form of a sintered body having any one of the above-mentioned compositions. Also employable are multi-source sputtering using more than one target and reactive sputtering.

When La and/or Ce is contained as the rare earth element, at least part of the sputtering target may be formed of the oxide of a pyrophoric alloy, for example, Auer metal, Huber metal, Misch metal, and Welsbach metal.

The solid protective layer 5 may be formed by any other vapor phase deposition techniques, for example, CVD, evaporation, and ion plating.

The solid protective layer 5 preferably has a Vickers hardness of at least 700 kgf/mm$^2$. Any one selected from the above-mentioned compositions can readily achieve a Vickers hardness of at least 700 kgf/mm$^2$. Inclusion of R gives a Vickers hardness of at least 1,000 kgf/mm$^2$.

The solid protective layer 5 is preferably about 30 to about 200 Å thick, more preferably about 30 to about 100 Å thick. A layer of a thickness below the range is too thin to provide protection. A thicker layer would cause an increased spacing loss, failing to increase the recording density.

The lubricating layer 6 is preferably disposed on the solid protective layer 5. The lubricating layer 6 is preferably composed of an organic compound, more preferably an organic compound having a polar group or a hydrophilic group or moiety.

The organic compound used herein is not particularly limited and may be either liquid or solid. Examples of the organic compound include fluoro organic compounds, for example, perfluoropolyethers as described in European Patent Laid-Open Publication Nos. 0165649 and 0165650, well-known fatty acids, esters, and alcohols.

The lubricating film may be formed by any desired techniques such as coating.

Preferably, the lubricating layer 6 on the surface has a contact angle with water of at least 70°, more preferably at least 90°. A choice of the contact angle within the range is effective in preventing the magnetic disk from clinging to the magnetic head, ensuring high dynamic operation stability.

Preferably, the lubricating layer 6 is about 5 to about 50 Å thick, more preferably about 10 to about 40 Å thick. A lubricating layer having a thickness below the range is too thin to provide lubricity while a thicker layer rather tends to increase friction.

It is to be understood that the lubricating layer 6 may be formed after the plastic film ring or rings are attached to the disk body, more exactly to the surface of the protective layer. Alternatively, the lubricating layer is first applied to the disk body, more exactly to the entire surface of the protective layer and then wiped off from an outer peripheral portion of the disk body where the plastic film ring or rings are attached. This is because the lubricating layer is not a rigid layer which can support the plastic film ring. Thus the plastic film ring is adhesively bonded to the surface of the magnetic layer directly or to the surface of the solid protective layer, if any.

Recording and reproducing operation for the magnetic disk of the present invention may be carried out with any magnetic heads. Since the magnetic disk of the invention is often of the perpendicular magnetizable type, better performance is obtained by combining it with a magnetic head of the perpendicular magnetizable type. Head abrasion is effectively prevented particularly when the disk is combined with a thin film perpendicular magnetic head. The preferred thin film perpendicular magnetic head is one comprising a ceramic base of $Al_2O_3$-TiC or similar ceramics, metallic poles of Co-Nb-Zr amorphous alloy on the base, and an inorganic protective film of $Al_2O_3$ or similar material.

EXAMPLE

Examples of the present invention are given below by way of illustration and not by way of limitation.

EXAMPLE 1

A disk body of the double-sided structure shown in FIG. was prepared. The respective components are as described below.

Substrate

Annular substrates were punched out of a polyimide sheet. It had a Young's modulus of 900 kgf/mm$^2$, a surface roughness Rmax of 0.015 $\mu$m, and a coefficient of linear expansion of about $1 \times 10^{-5}$/deg.

The outer diameter (OD) and thickness (T) of the substrates are shown in Table 1.

Soft magnetic film

A film of 80 at% Ni-Fe alloy was formed on the substrate to a thickness of 0.45 $\mu$m by DC magnetron sputtering in a 2% $O_2$-containing argon atmosphere at $2 \times 10^{-1}$ Pa. The resulting soft magnetic film had a coefficient of linear expansion of about $1 \times 10^{-5}$/deg. and a coercive force of 9 Oe in the plane of its surface.

Magnetic layer

A film of 20 at%Cr-Co alloy was formed on the soft magnetic film to a thickness of 0.18 $\mu$m by DC magnetron sputtering in a 2% $O_2$-containing argon atmosphere at $2 \times 10^{-1}$ Pa. The resulting magnetic film had a coefficient of linear expansion of about $1 \times 10^{-5}$/deg. and a perpendicular coercive force of 720 Oe.

It was observed that the substrate and the layer being formed were heated by radiant heat from the targets during formation of the soft magnetic layer and the magnetic layer.

Solid protective layer

A film of 51Si-3Al-15O-31N-3Y (expressed in atomic ratio) was formed on the magnetic film to a thickness of 0.01 $\mu$m by RF magnetron sputtering in a 2% $O_2$-containing argon atmosphere at $1 \times 10^{-1}$ Pa. The target used in sputtering was a sintered body having a corresponding composition. The resulting solid protective layer had a Vickers hardness of 950 kgf/mm$^2$. It is to be noted that the Vickers hardness was measured by forming a film of the same composition under the same conditions as for the solid protective layer of the magnetic disk, but to a thickness of 2 $\mu$m.

Lubricating layer

A lubricating layer was formed to a thickness of 20 Å by applying a solution of 0.1 wt. % of a compound of the formula:

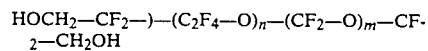

$HOCH_2-CF_2-)-(C_2F_4-O)_n-(CF_2-O)_m-CF_2-CH_2OH$ having a molecular weight of 2,000 by spin coating. The resulting film had a contact angle with water of 100° on the surface as measured at 30 seconds after dropwise application of water to the surface.

The lubricating layers were partially wiped off from outer peripheral portions on the opposite major surfaces of the disk body. Using a joining apparatus as shown in FIG. 6, a pair of plastic film rings were bonded to the outer peripheral portions on the opposite major surfaces of the disk body. There was obtained a magnetic disk sample as shown in FIG. 3.

The plastic film rings and the adhesive used are shown below.

Adhesive layer

An acrylate ester adhesive was applied to a PET film by coating. The thickness (t3) of the adhesive layer is shown in Table 1.

Plastic film ring

The PET film used had a Young's modulus of 500 kgf/mm$^2$. A ring was die cut from the PET film having the adhesive applied using a blanking apparatus as shown in FIG. 5.

The ring had the thickness (t1), outer diameter (OD), and radial distance (Dr) reported in Table 1.

As a control, one magnetic disk sample was not provided with the ring.

The magnetic disk samples thus prepared were measured for error rate. To this end, a floppy disk drive for perpendicular magnetic recording connected to Time Interval Analyzer Model TIA 3100 by KODE DIVISION OF ODETICS, Inc. was loaded with the disk sample.

The magnetic head used was a mono-pole thin film head of the main pole excitation type having a pole thickness of 0.2 $\mu$m and a pole width of 50 $\mu$m. The thin film head was prepared by forming a Co-Nb-Zr amorphous alloy pole on an $Al_2O_3$-TiC base and an $Al_2O_3$ protective film thereon both by sputtering. It was operated under a load of 10 grams and a sliding speed of 2 m/sec.

The magnetic disk had 140 tracks on one side from the outermost track designated track 0 to the innermost track designated track 139. The measurement of error rate was done at track 70.

The measurements were rated according to the following criterion.
E: $<10^{-11}$
G: $10^{-11}$ to $10^{-8}$ (exclusive)
F: $10^{-8}$ to $10^{-5}$ (exclusive)
P: $\geq 10^{-5}$ The results are shown in Table 1.

TABLE 1

| Sample No. | Substrate OD (mm) | Substrate T (μm) | Plastic film ring t1 (μm) | Plastic film ring OD (mm) | Plastic film ring Dr (mm) | Adhesive t3 (μm) | Error rate |
|---|---|---|---|---|---|---|---|
| 1 control | 86 | 40 | — | — | — | — | P |
| 2* | 86 | 40 | 15 | 88 | 2 | 50 | F |
| 3 | 86 | 40 | 40 | 88 | 2 | 50 | E |
| 4 | 86 | 40 | 70 | 88 | 2 | 50 | E |
| 5* | 86 | 40 | 100 | 88 | 2 | 50 | P |
| 6 | 86 | 30 | 50 | 89 | 3 | 40 | G |
| 7 | 86 | 50 | 70 | 89 | 3 | 40 | G |

*outside the scope of the invention

Magnetic disk sample Nos. 1, 3 and 5 were measured for reproduced output at track 70 to determine its variation. FIGS. 8, 9, and 10 are oscilloscopic diagrams showing the reproduced output envelopes of sample Nos. 1, 3, and 5, respectively.

As seen from these diagrams, sample No. 3 of the invention showed a minimal variation of output. (control and comparative samples showed largely varying outputs, which are believed to contribute to an increased error rate.

These samples were also measured for reproduced output variation at tracks 0 and 139. Sample No. 3 of the invention showed a minimal variation of output comparable to FIG. 9. Sample Nos. 1 and 5 showed largely varying outputs similar to those in FIGS. 8 and 10.

Example 2

Magnetic disk samples were prepared by approximately the same procedure as in Example 1 except that a single plastic film ring was bonded to only one major surface of the disk body. They were analyzed by the same methods as in Example 1.

The dimensions of the respective components are reported in Table 2 together with the results of measurement.

TABLE 2

| Sample No. | Substrate OD (mm) | Substrate T (μm) | Plastic film ring t2 (μm) | Plastic film ring OD (mm) | Plastic film ring Dr (mm) | Adhesive t3 (μm) | Error rate |
|---|---|---|---|---|---|---|---|
| 11* | 86 | 40 | — | — | — | — | P |
| 12* | 86 | 40 | 15 | 88 | 2 | 50 | P |
| 13 | 86 | 40 | 40 | 88 | 2 | 50 | G |
| 14 | 86 | 40 | 70 | 88 | 2 | 50 | E |
| 15 | 86 | 40 | 100 | 88 | 2 | 50 | G |
| 16 | 86 | 30 | 50 | 89 | 3 | 40 | G |
| 17 | 86 | 50 | 70 | 89 | 3 | 40 | G |

*outside the scope of the invention

These data demonstrate the effectiveness of the invention.

As understood from the foregoing description, the magnetic disk according to the present invention physically operates in a stable manner and shows minimized reproduced output variation and error rate since it is surrounded by a binding ring or rings of specific dimensions.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnetic disk comprising:
an annular flexible substrate having a Young's modulus of about 30 to about 1,000 kgf/mm$^2$ and a pair of opposed major surfaces,
a magnetic layer on at least one substrate major surface, and
a pair of plastic film rings having a Young's modulus of at least 300 kgf/mm$^2$, the rings being secured to the outer periphery of the disk on opposite major surfaces of said substrate,
wherein the following relationships are met:

$$T-20 \leq t1 \leq T+4$$

and $$t1 \geq 10$$

wherein t1 is the thickness of μm of each ring and T is the thickness of μm of the substrate.

2. A magnetic disk comprising:
an annular flexible substrate having a Young's modulus of about 300 to about 1,000 kgf/mm$^2$ and a pair of opposed major surfaces,
a magnetic layer on at least one substrate major surface, and
a single plastic film ring having a Young's modulus of a least 300 kgf/mm$^2$, the single ring being secured to the outer periphery of the disk on one of the opposed major surfaces of said substrate,
wherein the following relationships are met:

$$2T-40 \leq t2 \leq 2T+80$$

and $$t2 \geq 20$$

wherein t2 is the thickness of μm of the ring and T is the thickness of μm of the substrate.

3. The magnetic disk of claim 1 or 2 wherein the thickness (T) of said substrate is in the range of 15 to 100 μm.

4. The magnetic disk of claim 1 or 2 wherein said plastic film ring is secured to the outer periphery of the disk through an adhesive layer of 10 to 75 μthick.

5. The magnetic disk of claim 1 or 2 wherein said plastic film ring contains a powder inorganic filler.

6. The magnetic disk of claim 1 or 2 wherein said magnetic layer is a perpendicular magnetizable film formed by vapor phase deposition.

7. The magnetic disk of claim 1 or 2 which further comprises a soft magnetic layer formed between said substrate and said magnetic layer by vapor phase deposition.

8. The magnetic disk of claim 1 or 2 which further comprises a solid protective film on said magnetic layer, said protective film containing at least one element selected from the group consisting of metals and metalloids and oxygen and being formed by vapor phase deposition.

9. The magnetic disk of claim 8 which further comprises a lubricating film on said solid protective film, said lubricating film containing an organic compound.

10. The magnetic disk of claim 1, wherein the pair of plastic film rings extend radially beyond an edge of the outer periphery of the disk and are cantilevered.

* * * * *

UNITED STATES PATENT AND TRADEMARK OFFICE
CERTIFICATE OF CORRECTION

PATENT NO. : 5,061,537
DATED : October 29, 1991
INVENTOR(S) : Yukari Kobayashi et al.

It is certified that error appears in the above-identified patent and that said Letters Patent is hereby corrected as shown below: On the title page, Item [54]

The title is incorrect, should be, --MAGNETIC DISK COMPRISING A FLEXIBLE SUBSTRATE AND A PLASTIC FILM RING EACH HAVING A SPECIFIED YOUNG'S MODULUS AND WHICH MEET SPECIFIED THICKNESS RELATIONSHIPS--.

Signed and Sealed this

Twenty-second Day of June, 1993

Attest:

MICHAEL K. KIRK

*Attesting Officer*     Acting Commissioner of Patents and Trademarks